Sept. 19, 1950 G. F. METCALF 2,523,043

FREQUENCY MODULATION RECEIVER SYSTEM

Filed March 27, 1948

Inventor:
George F. Metcalf,
by Merton D Moore
His Attorney.

Patented Sept. 19, 1950 2,523,043

UNITED STATES PATENT OFFICE 2,523,043

FREQUENCY MODULATION RECEIVER SYSTEM

George F. Metcalf, Syracuse, N. Y., assignor to General Electric Company, a corporation of New York Application March 27, 1948, Serial No. 17,443

7 Claims. (Cl. 250—27)

This invention relates to frequency modulation receiving systems and the like, and more particularly to an electron discharge device demodulating circuit for use in such systems.

It is an object of this invention to provide a highly stable electron discharge device stage for use in frequency modulation receiving systems and the like, which may be utilized for the demodulation of frequency modulated signals received by such systems.

It is a further object of this invention to provide in frequency modulation receiving systems and the like, means comprising a single electron discharge device stage for amplifying and demodulating frequency modulated signals received by such systems.

Yet another object of this invention is to provide such a single electron discharge device stage for use in frequency modulation receiving apparatus and the like, in which the amplitude of a frequency modulated signal, received by such apparatus, may be limited and in addition the signal may be amplified and demodulated in this single stage.

Figure 2:
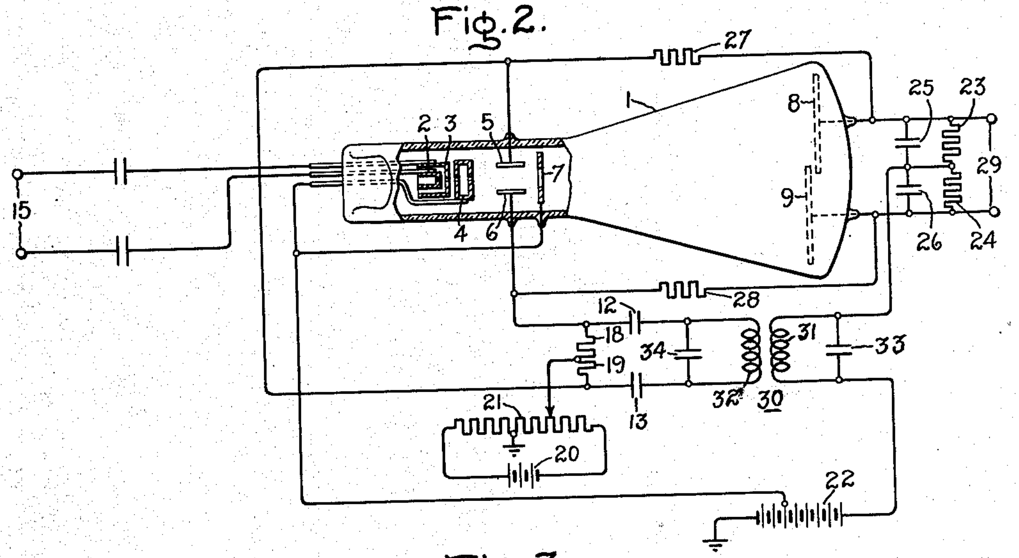
Figure 3:
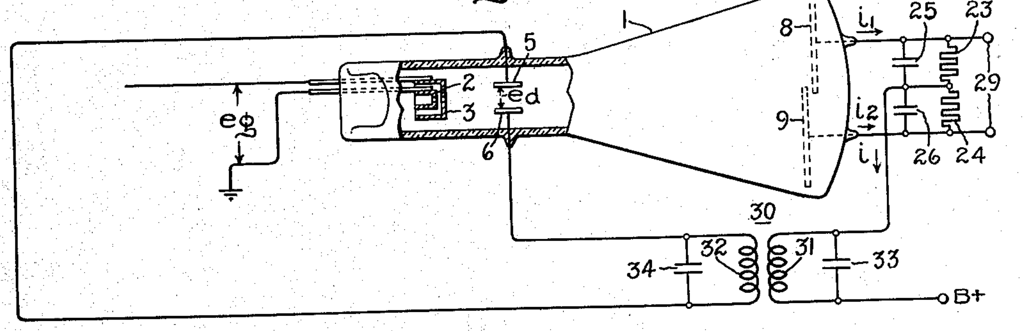

The features of this invention which are believed to be new are set forth with particularity in the appended claims. The invention itself, however, together with further objects and advantages thereof may best be understood by reference to the accompanying drawing, wherein Fig. 1 shows one embodiment of the present invention, Fig. 2 shows a modification thereof, and Fig. 3 is a diagram useful for the mathematical development of the operation of my electron beam tube circuits.

Figure 1:
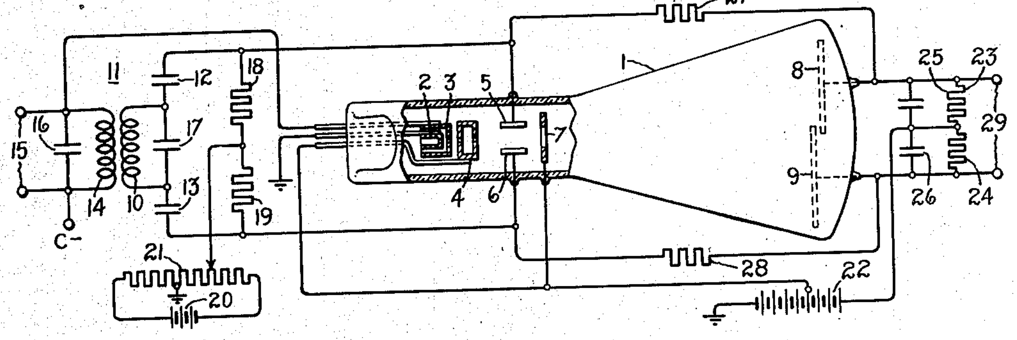

Referring now to the drawing, Fig. 1 shows a frequency modulation detector or demodulator circuit including an electron beam tube comprising a cathode 2, control electrode 3, accelerating electrode 4, a pair of deflection electrodes 5 and 6, a collector electrode 7 and a pair of target electrodes 8 and 9. Deflection electrodes 5 and 6 are coupled to the secondary winding 10 of a transformer 11 through capacitors 12 and 13 respectively, secondary winding 10 being tuned by capacitor 17. The primary winding 14 of transformer 11 is tuned by capacitor 16, and may be coupled to any source of frequency modulated signals by way of terminals 15. When the detector stage is used in a conventional frequency modulation superheterodyne receiving system, transformer 11 comprises an intermediate frequency transformer, and the primary winding 14 and secondary winding 10 is tuned to the intermediate frequency by capacitors 16 and 17 respectively. One extremity of primary winding 14 is coupled to control electrode 3, as shown, and the other extremity of this winding may be connected to a biasing source C—. Focussing control is provided for the electron beam by means of resistors 18 and 19 serially connected between deflection electrodes 5 and 6. Unidirectional potential is applied to the common junction of resistors 18 and 19 from a unidirectional source 20 and the value of this potential is varied by focus control potentiometer 21.

Electrodes 4 and 7 are connected to a positive tap on unidirectional source 22, and target electrodes 8 and 9 are respectively connected to a higher positive potential tap on this source through serially connected resistors 23 and 24, as shown. Capacitors 25 and 26 provide a bypassing path for signal frequencies between the target electrodes 8 and 9.

Beam centering means are provided by resistors 27 and 28 respectively connecting target electrode 8 to deflection electrode 5, and target electrode 9 to deflection electrode 6. It can be seen that when the electron beam tends to fall on one target electrode a potential drop occurs in the resistor connecting this electrode to the corresponding deflection electrode, which tends to shift the beam towards the other target electrode thus providing an automatic beam centering means This feature is more particularly described and claimed in the copending application Serial No. 4,810, now U. S. Patent No. 2,510,623, filed January 28, 1948, by Robert B. Dome for "Deflection Limiter" and assigned to the same assignee as the present invention.

Audio output may be derived across resistors 23 and 24 by way of terminals 29, and this output may be applied to the usual audio amplifier stages and signal translating devices.

Under normal conditions, a unidirectional potential is impressed across deflection electrodes 5 and 6, and this potential is adjusted by means of focussing control 21 until a condition is achieved whereby the anode currents in target electrodes 8 and 9 are equal for the no-signal condition. When a signal is applied to control electrode 3, the potentials at the extremity of resistors 23 and 24 increase and decrease together at the frequency of the applied signal so that no potential difference is established across these resistors and no signal is derived across terminals 29. When an additional signal is applied to deflection electrodes 5 and 6 at the same frequency as the signal applied to control electrode 3, it can be shown that a unidirectional potential is thereby established at terminals 29. It can further be shown that this unidirectional potential is zero when the control electrode potential and the deflection electrode potential are in phase quadrature, and that for small phase variations about this point the unidirectional output at terminals 29 is proportional to the phase deviation from the quadrature condition.

In operation, when a signal is impressed across terminals 15, and when the primary winding 14 and secondary winding 17 are tuned to the center frequency of this signal, the signal thereby applied to control electrode 3 is in phase quadrature to the signal applied to the deflection electrodes 5 and 6, and, hence, the potential drop across resistors 23 and 24 is zero, and no signal appears at output terminals 29. However, when the frequency of the signal applied to terminals 15 is caused to shift about this center frequency, the phase relation between the signal on the control electrode, and the signal on the deflection electrode changes with this frequency shift and potential drop appears across resistors 23 and 24, the amplitude and sign of this potential drop being proportional to the magnitude and direction of the frequency deviation of the signal applied to terminals 15. Hence, an audio signal may be derived at terminals 29 in response to a signal modulated in frequency applied to terminals 15.

One advantage of the above-described device is that the amplitude of the audio signal output may be many times larger than that of the input signal applied thereto. It has been found that electron beam tubes constructed as described in the foregoing are capable of providing one milliampere change in target electrode current per volt change in deflection electrode potential. When resistors 23, 24 have a value of the order of 200,000 ohms, a conversion gain of 200 fold is realized.

In order to meet all the requirements of a satisfactory frequency modulation detector, amplitude limiting action is incorporated in the present device. This limiting action is obtained by the provision of electrode 7 in the electron beam tube, this electrode being so arranged that when the electron beam deflection potential exceeds a certain limit, the beam is intercepted by electrode 7 which is independent of the output circuit, and hence undesired amplitude modulation may be removed from the frequency modulated signals applied to terminals 15, and electrode 7 thereby provides the desired limiting action.

A preferred embodiment of the proposed detector system is shown in Fig. 2, wherein still higher detection sensitivity is accomplished. The basic operation of this system is similar to that of Fig. 1 except that in this embodiment, the input signals are amplified prior to their application to deflection electrodes 5 and 6. An input signal impressed across terminals 15 is applied between control electrode 3 and cathode 2. This signal is amplified in the electron beam tube 1 and the amplified signal is applied to the deflection electrodes 5 and 6 through transformer 30. Transformer 30 has a primary winding 31 and secondary winding 32, these windings being tuned respectively by capacitors 33 and 34 to the center frequency of the input signal.

As in the previous instance there is no output at terminals 29 at the center frequency of the input signal, due to the quadrature phase shift between the input signal and the signal applied to deflection electrodes 5 and 6 by way of transformer 30. However, when the frequency of the applied signal is deviated, the phase relation between the signal applied to control electrode 3, and the signal applied to deflection electrodes 5 and 6 varies in response thereto, and an amplified output signal is produced at terminals 29, the amplitude and sign of this signal being proportional to the magnitude and direction of the frequency shift of the input signals.

One of the important features of this circuit is the isolation of the control electrode from the deflection electrode signals. This makes it possible to obtain deflection potentials from the tube-amplified control electrode potential without introducing feed-back in the conventional sense, which would give rise to undesired regeneration.

Referring now to Fig. 3 which shows the basic diagram of the electron beam tube circuit as previously shown in Fig. 2, the instantaneous signals on control electrode 3 and deflection electrodes 5 and 6 are indicated as $e_g$ and $e_d$ respectively. The instantaneous anode current of target electrode 8 is shown as $i_1$, that of target electrode 9 is shown as $i_2$, and the combined instantaneous current which appears in the lead to the unidirectional potential source B+ is shown as $i$. Resistor 23 is made equal to resistor 24 and these resistors are assumed to have individual values R.

The two basic equations are:

(1) $$i=g_m e_g$$

where: $g_m$ is the mutual conductance of the electron beam tube.

(2) $$\begin{cases} i_1=\frac{1}{2}i(1+g_d e_d) \\ i_2=\frac{1}{2}i(1-g_d e_d) \end{cases}$$

where: $g_d$ is the unit change in current to either target electrode for volt deflection potential.

It is apparent that $e_d$, the instantaneous potential between deflection electrodes 5 and 6 is the secondary potential of transformer 30. Hence, $$e_d=R^1 i\underline{|\theta_\omega}$$

where: $R^1$ is the equivalent resistance or loading on transformer 30. $\theta_\omega$ is the secondary phase angle.

(3) that is, $$e_d=g_m R^1 e_g\underline{|\theta_\omega}$$

That is, the output of transformer 30 which is applied to deflection electrodes 5 and 6 is shifted through a phase angle $\theta_\omega$ with respect to the signal $e_g$, the latter being a function of the frequency of the input signal.

Equation 2 then becomes:

(4) $$\begin{cases} i_1=\frac{1}{2}g_m e_g(1+g_d g_m R^1 e_g\underline{|\theta_\omega}) \\ i_2=\frac{1}{2}g_m e_g(1-g_d g_m R^1 e_g\underline{|\theta_\omega}) \end{cases}$$

The audio output to terminals 29 is given by $R(i_1-i_2)$ and from Equation 4, (5) $$i_1-i_2=g_d g_m^2 R^1(e_g \cos \omega t)(e_g \cos [\omega t+\theta_\omega])$$

which has a unidirectional or audio term, (6) $$i_1-i_2=\frac{1}{2}g_d g_m^2 R^1 e_g^2 \cos \theta_\omega$$

As previously stated, the primary winding 31 and secondary winding 32 of transformer 30 are tuned to the center frequency of the input signal, and at this frequency the phase shift $\theta_\omega$ is 90° and from Equation 6 it can be seen that the audio output across resistors 23 and 24 is zero. When the frequency of the input signal is deviated from the center frequency, the phase angle $\theta_\omega$ shifts an angle $\alpha$ from 90° and the output across resistors 23 and 24 becomes:

$$(7) \qquad i_1 - i_2 = \tfrac{1}{2} g_d g_m^2 R^1 e_s^2 \sin \alpha$$

For sufficiently small values of $\alpha$ a substantially linear response of audio output is obtained at terminals 29 for linear frequency deviation of the input signal. The linearity is sufficiently accurate for normal operation so that negligible distortion results in the audio output.

This invention, therefore, provides an electron beam tube circuit for use in frequency modulation receiving systems and the like wherein the functions of limiting, amplifying and detection are combined in a single tube stage.

While certain specific embodiments have been shown and described, it will, of course, be understood that various modifications may be made without departing from the invention. The appended claims are, therefore, intended to cover any such modifications that fall within the true spirit and scope of the invention.

What I claim as new and desire to secure by Letters Patent of the United States is:

1. In a frequency modulation receiving system and the like, an evacuated envelope, means therein for producing a stream of electrical particles, means for controlling the intensity of said stream, means for deflecting said stream to either side of a mean path and means for extracting energy from said stream, means for impressing a frequency modulated signal received by said system on said stream intensity controlling means, means for deriving an amplified signal from said energy extracting means, means for impressing a portion of said amplified signal on said stream deflecting means, said portion being phase displaced from said received frequency modulated signal and said phase displacement being proportional to the frequency variations of said received signal about the center frequency thereof, further means for deriving an amplified audio signal from said energy extracting means in response to the frequency modulation of said received signal.

2. In a frequency modulation receiving system and the like, an evacuated envelope, means therein for producing a stream of electrical particles, means for controlling the intensity of said stream, means for deflecting said stream to either side of a mean path, and target electrode means for intercepting said stream on either side of the axis of said path, means coupled to said target electrode means for deriving an amplified potential, said potential being phase displaced with respect to a frequency modulated signal received by said system, said phase displacement being proportional to the frequency variation of said frequency modulated signal about the center frequency thereof, means for impressing said signal on said stream intensity controlling means, means for impressing said potential on said stream deflecting means, further means comprising an output circuit coupled to said target electrode means, means for deriving an amplified audio signal from said output circuit in response to the frequency modulation of said received signal.

3. In a frequency modulation receiving system and the like, an evacuated envelope having therein, a cathode, a control electrode, an accelerating electrode, a pair of deflecting electrodes, and a pair of target electrodes, means for maintaining a difference in potential between said accelerating electrode and said cathode to produce an electric field causing a stream of electrons to travel from said cathode, means coupled to said target electrodes for deriving an amplified potential, said potential being phase displaced with respect to a frequency modulated signal received by said system, said phase displacement being proportional to the frequency variation of said frequency modulated signal about the center frequency thereof, means for impressing said signal between said control electrode and said cathode, means for impressing said potential on said deflecting electrodes to deflect said stream to either side of a mean path, said target electrodes intercepting said stream on either side of the axis of said path, an output circuit similarly coupled to said target electrodes, and means for deriving an amplified audio signal from said output circuit in response to the frequency modulation of said received signal.

4. A frequency modulation detector stage including, an electron beam tube having a cathode, a control electrode, beam deflecting means and a pair of target electrodes, means for impressing a received frequency modulated signal on said control electrode, means for deriving an amplified signal at said target electrodes, means for impressing a portion of said amplified signal on said beam deflecting means, said portion being phase displaced with respect to said received signal and said phase displacement being proportional to the frequency variation of said received frequency modulated signal about the center frequency thereof, an output circuit coupled to said target electrodes, means for deriving an amplified audio signal from said output circuit in response to the frequency modulation of said received signal.

5. A frequency modulation detector stage including, an electron beam tube having a cathode, a control electrode, beam deflecting means and a pair of target electrodes, means for impressing a received frequency modulated signal on said control electrode, means for deriving an amplified signal at said target electrodes, phase shifting means coupled to said target electrodes for impressing a portion of said amplified signal on said beam deflecting means, said portion being thereby phase displaced with respect to said received signal and said phase displacement being proportional to the frequency variation of said received frequency modulated signal about the center frequency thereof, an output circuit coupled to said target electrodes, means for deriving an amplified audio signal from said output circuit in response to the frequency modulation of said received signal.

6. A frequency modulation detector stage including, an electron beam tube having a cathode, a control electrode, beam deflecting means, and a pair of target electrodes, means for impressing a received frequency modulated signal on said control electrode, a transformer having a primary winding and a secondary winding, said windings being tuned substantially to the center frequency of said received frequency modulated signal, means for coupling said primary winding to said target electrodes, means for coupling said secondary winding to said beam deflecting electrodes, an output circuit similarly coupled to said target electrodes, means for deriving an amplified audio signal from said output circuit in response to the frequency modulation of said received signal.

7. A frequency modulation detector stage including, an electron beam tube having a cathode, a control electrode, beam deflecting means, a pair of beam intercepting electrodes and a pair of target electrodes, means for impressing a received frequency modulated signal on said control electrode, a transformer having a primary winding and a secondary winding, said windings being tuned substantially to the center frequency of said received signal, means for coupling said primary winding to said target electrodes, means for deriving a potential from said secondary winding, said potential being phase displaced with respect to said received signal and said phase displacement being proportional to the frequency variation of said received frequency modulated signal, means for impressing said potential on said beam deflecting means to deflect the electron beam in said tube to either side of a mean path, said target electrodes intercepting said beam on either side of the axis of said path for deflection of said beam within a certain predetermined limit, and said beam intercepting electrode intercepting said beam for beam deflections beyond said limit, an output circuit coupled to said target electrodes, and means for deriving a limited amplified audio signal from said output circuit in response to frequency variations of said received frequency modulated signal.

GEORGE F. METCALF.

REFERENCES CITED

The following references are of record in the file of this patent:

UNITED STATES PATENTS

| Number | Name | Date |
|---|---|---|
| 2,024,979 | Metcalf | Dec. 17, 1935 |
| 2,269,688 | Rath | Jan. 13, 1942 |
| 2,322,556 | Ziebolz | June 22, 1943 |

Certificate of Correction

Patent No. 2,523,043 September 19, 1950

GEORGE F. METCALF

It is hereby certified that error appears in the printed specification of the above numbered patent requiring correction as follows:

Column 4, line 68, for the indistinct portion of the equation following

"R'e" read $\frac{2}{g}$ and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*